Patented Dec. 1, 1931

1,834,799

UNITED STATES PATENT OFFICE

OSCAR NICKEL, OF MULHEIM-RUHR, AND REINHOLD MARKWITZ, OF DUISBURG, GERMANY

PROCESS FOR THE MANUFACTURE OF CEMENT

No Drawing. Application filed June 3, 1924, Serial No. 717,578, and in Austria May 18, 1922.

The present invention relates to a process for the manufacture of cement from slag and other dry substances containing silicates, such as natural minerals or waste products.

Numerous processes have been suggested and are known, for producing cement by means of the reaction between lime and substances containing silicic acid or silicates. Furnace slag especially (such as blast furnace slag) has frequently been employed for this purpose. However, the procedure has always been started from the point of view that, in the finished cement, a certain reciprocal action must take place between the acid and basic components, that is between the silicates and the lime in the presence of moisture, if the finished cement was required to possess the desired firm binding or setting properties.

Thus it has been suggested to grind granulated furnace slag together with slaked lime, the slag containing water is received from the granulating process has most commonly been used for this, on the one hand, to avoid the need of a drying process, and on the other hand, because of the idea that the quicklime, when added to it and ground with it, would exercise a certain opening effect on the silicate, owing to the heat generated by the reaction of the lime with the water contained in the slag, thereby giving the properties of cement to the finished mixture. Also the taking up of water by the quick-lime has been made use of for drying the granulated slag. In cases where the water content of the water-granulated slag has been reduced considerably, for example, owing to its having been stored for some time, it has even been considered necessary to add considerable quantities of water to the mixture of the granulated slag and lime, either during the process of grinding or afterwards. This water was added with the idea that the normal water content of the granulated slag was necessary for reacting with any quick lime present.

According to the present invention, a cement of quite excellent properties and of surprising keeping qualities is obtained by the employment of technically dry furnace slag, or similar silicious material (other metallurgical slag, boiler slag, trass, tufa, and so on) which is ground together with burned unslaked lime, to the fineness of cement. We call attention to the fact that the granulated slag is in a dry state. By this, we do not mean that the slag is absolutely anhydrous, but it should not contain substantially more than, say, 3% moisture.

We regard slags as technically dry, when the water content does not exceed 3%. The water content cannot be cheaply reduced much below 1%, even when the slag material is heated for some time over 100° C., so that it is no longer possible to detect any escape of moisture. It appears as if a small amount of water remains in combination as water of hydration. Naturally, for the process in question, the slag can also be dried, as if by analysis, i. e., the water content be reduced to 0%. But such an anhydrous condition could probably be attained only at a low red heat. This is excluded for economic reasons and the slag would also be in danger of undergoing devitrification. But the slag must be technically dry, the water content not appreciably exceeding 3%. The same conditions exist for pumice stone and tufa. The drying of these latter is somewhat more difficult, but here, also, the highest permissible limit is between 3% and 4%. We make no claim to treating granulated slag in a wet state with lime, nor to the treatment of slaked lime with wet or dry slag.

In addition to the above materials, technically dry silicate and unslaked lime, we also employ gypsum, say about 1 to 5% of the entire mixture, this material being preferably used in its natural condition, that is, without previous calcination. It is preferably ground with the other two materials.

The proportion of lime to silica used in making the cement, so calculated that the entire lime content of the finished cement (including that contained as a constituent of the slag) ranges from about 50 to 56%. With a low percentage of alumina, it is about 50%. With a high percentage of alumina, it is about 56%.

The present application is a part continuation of our copending application filed July 28, 1922, Serial No. 578,223.

It has been found that the keeping qualities of the cement are dependent to an important extent on the absence of hydrates of lime, hence the need of previously drying the materials. The ingredients can also be ground first separately and mixed afterwards; however, grinding together is more practical.

In place of the quick-lime of more or less high percentage, hydraulic lime can be used, provided it does not contain any silicates.

As to the matter of proportions, the preferred proportions will vary considerably, depending on the composition of the silicate materials to be used. Thus the following examples are given, for illustration, and not as restricting the invention thereto:

Example 1

2 to 5 parts of gypsum
3 to 16 parts of unslaked lime
95 to 79 parts of dried water-granulated blast furnace slag.

Example 2

2 to 5 parts of gypsum
6 to 20 parts of unslaked burned lime
90 to 75 parts of dried water-granulated slag from copper smelting.

Example 3

2 to 5 parts of gypsum
6 to 20 parts of unslaked burned lime
92 to 75 parts of dried pumice or trass.

We claim:

Cement comprising a mixture of about 3 to 20% of burned unslaked lime, about 75 to 95% of substantially dried water-granulated furnace slag, and about 1 to 5% of gypsum, all ground to approximately the fineness of ordinary cement.

In testimony whereof we affix our signatures.

OSCAR NICKEL.
REINHOLD MARKWITZ.